United States Patent
Sterett

(10) Patent No.: US 6,743,977 B1
(45) Date of Patent: Jun. 1, 2004

(54) CABLE JUNCTION BOX WITH UNIVERSAL HARDWARE MOUNTING

(75) Inventor: Robert Sterett, Jackson, MI (US)

(73) Assignee: Eaglepro Industries, L.L.C., Jackson, MI (US)

( * ) Notice: Subject to any disclaimer, the term of this patent is extended or adjusted under 35 U.S.C. 154(b) by 0 days.

(21) Appl. No.: 10/108,754

(22) Filed: Mar. 28, 2002

Related U.S. Application Data

(60) Provisional application No. 60/279,345, filed on Mar. 28, 2001.

(51) Int. Cl.[7] ................................................. H02G 3/08
(52) U.S. Cl. ..................... 174/50; 174/48; 174/135; 174/58; 220/3.8; 220/4.02; 248/906
(58) Field of Search ....................... 174/50, 48, 58, 174/60, 66, 135; 220/241, 3.8, 4.02; 248/906; 439/535; 33/528

(56) References Cited

U.S. PATENT DOCUMENTS

| | | | | |
|---|---|---|---|---|
| 4,185,406 A | * | 1/1980 | Schotsman | 40/361 |
| 4,195,194 A | * | 3/1980 | Kuster et al. | 174/59 |
| 5,270,490 A | * | 12/1993 | Yang | 174/48 |
| 5,796,037 A | * | 8/1998 | Young et al. | 174/50 |
| 6,101,773 A | * | 8/2000 | Chau et al. | 52/220.7 |
| 6,291,767 B1 | * | 9/2001 | Beecher et al. | 174/50 |

\* cited by examiner

*Primary Examiner*—Dhiru R Patel
(74) *Attorney, Agent, or Firm*—Young & Basile, P.C.

(57) ABSTRACT

The specification discloses a universal cable junction box having an interior volume defined by side walls, a bottom, and a cover. The interior volume has provided therein a plurality of hardware mounting channels each includes by a pair of spaced-apart interior walls. The hardware mounting channels are arranged to define a pattern of repeating geometric shapes.

15 Claims, 5 Drawing Sheets

CABLE JUNCTION BOX WITH UNIVERSAL HARDWARE MOUNTING

RELATED APPLICATIONS

This application is related to, and claims the benefit of priority from, U.S. Provisional Patent Application Serial No. 60/279,345, filed Mar. 28, 2001

FIELD OF THE INVENTION

The present invention relates to cable junction boxes, such as are employed, for example, in the commercial cable television, electrical, and telephone industries to facilitate the routing of incoming cable to one or more separate locations, and more particularly to a cable junction box that is adapted to accommodate any of a wide array of cables and associated hardware components, including connectors, splitters, etc., in myriad locations and orientations within the junction box.

BACKGROUND

Cable junction boxes are a common sight in modern residential and business landscapes, where the advent of high speed data communications, telephone and facsimile communications, satellite television services, and cable television (CATV) services have transformed the way people both work and live. Such junction boxes are particularly employed in routing cables, including voice communication, CATV, and other signal and data communication cables from a remote location, for instance an underground or overhead CATV service line, a satellite dish, or the like, and into individual buildings and residences, etc.

Conventional junction boxes, such as shown in FIG. 1, generally include a receptacle portion 10 comprising side walls 11 and a bottom surface 12 defining an interior volume for mounting such hardware as is necessary or desired in connection with a given application. A cover portion 13 hingedly connected to the receptacle portion 10 protects the interior volume of the receptacle portion 10 from the elements, inasmuch as junction boxes are commonly disposed outdoors. The cover 13 and receptacle 10 portions each include cooperating latch means 14, as well as cooperating means 15 for receiving a padlock or other lock means, in order to secure the junction box in a closed condition. The interior of the conventional junction box includes a plurality of discrete bosses 16 extending upwardly from the bottom surface 12 of the receptacle 10. Each such boss 16 includes a slot 17 defined therein, as shown, the slots 17 providing a point of attachment for mounting on the junction box such hardware as may be desired, including, by way of non-limiting example, CATV cable and/or telephone cable splitters, etc. One or more cables are threaded to the interior of the junction box via entry ports (not visible) provided in a side wall 11. Interiorly, a foam strip 19 is provided adjacent the entry ports 18 to sealingly engage the incoming cable or cables, thereby sealing the interior against moisture and the like. The bottom surface 12 is further provided with a plurality of recessed openings 20 therethrough dimensioned to receive bolts, screws, or other fasteners to thereby facilitate mounting the junction box to a suitable support surface or structure, for instance the side of a residential or commercial building.

One drawback attending conventional junction boxes as described above is that the arrangement and design of the discrete bosses 16 limits the applicability of any given junction box to one or a relatively limited number of uses. This is because these bosses as shown and described provide for only very limited possibilities in the arrangement and orientation of such hardware as may be need to be mounted in the junction box.

It would therefore be desirable to provide a junction box that is at once economical to manufacture and well suited for mounting a variety of hardware therein in a multitude of arrangements and orientations, and in association with numerous applications, including CATV, telephone, and other communications and signal transmission applications, as well as electrical wiring applications.

SUMMARY OF THE DISCLOSURE

The present invention addresses and solves the problems of conventional junction boxes, and encompasses other features and advantages, by providing a universal cable junction box having an interior volume defined by side walls, a bottom, and a cover. The interior volume has provided therein a plurality of hardware mounting channels each comprising a pair of spaced-apart interior walls, the hardware mounting channels further being arranged to define a pattern of repeating geometric shapes.

According to one embodiment of this invention, the hardware mounting channels are arranged to define a pattern of repeating hexagons.

According to a further embodiment of this invention, the hardware mounting channels are arranged to define a pattern of repeating circles.

Per yet another embodiment of this invention, the hardware mounting channels are arranged to define a pattern of repeating octagons.

According to a still further embodiment, the hardware mounting channels are arranged to define a pattern of repeating triangles.

Per another embodiment, the hardware mounting channels are arranged to define a pattern of repeating squares.

According to one feature of this invention, the hardware mounting channels are arranged in a plurality of generally parallel, spaced-apart rows extending in a first direction, and a plurality of generally parallel, spaced-apart rows of hardware mounting channels extending in a second direction generally perpendicular to the first direction, to thereby define a pattern characterized by repeating squares. The plurality of rows of hardware mounting channels may, according to another feature, be oriented at an angle relative to the side walls of the cable junction box.

Per another feature of the present invention, the adjacent parallel rows of hardware mounting channels are spaced approximately 0.71 inches apart.

According to still another feature of this invention, the interior walls extend generally upwardly from the bottom, and are further arranged to extend continuously through the intersection of each of the rows of hardware mounting channels.

BRIEF DESCRIPTION OF THE DRAWINGS

These and other objects, features, and advantages of the present invention will become apparent upon reference to the following description and drawings, in which.

DESCRIPTION OF THE ILLUSTRATED EMBODIMENT

Figure 1:
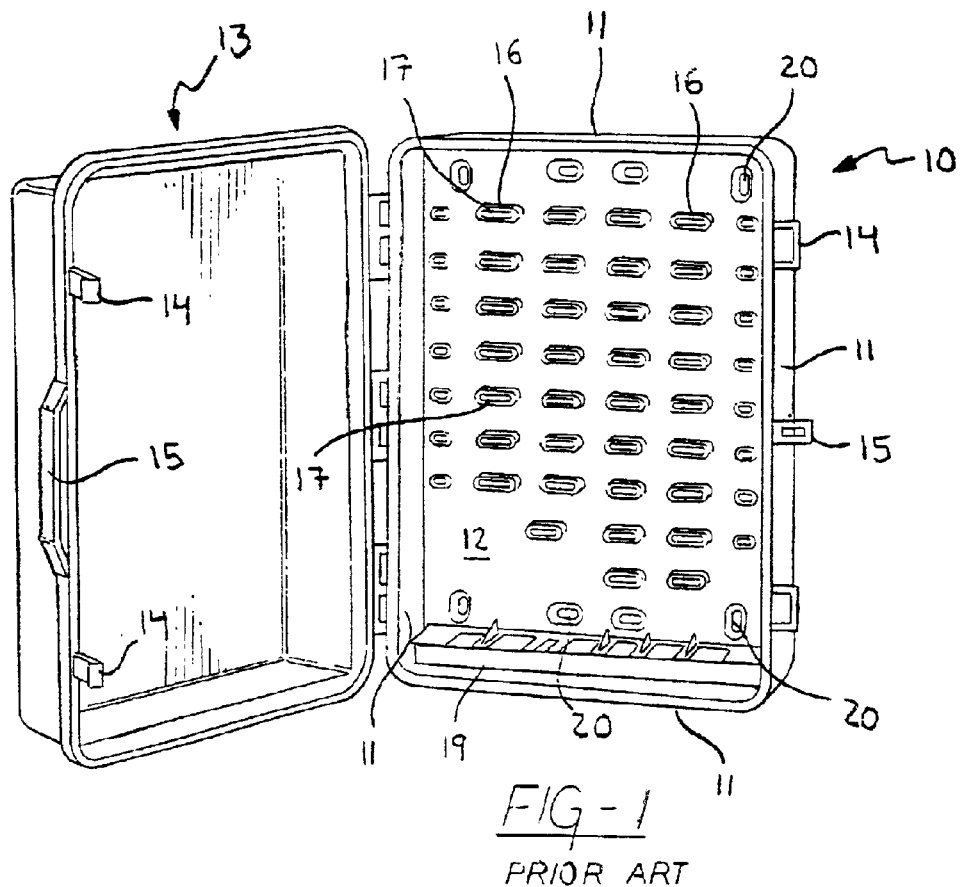
FIG. 1 is a perspective view of a prior art cable junction box.

Referring now to the drawings, wherein like numerals indicate like or corresponding parts, the present inventive cable junction box 100 will be seen to most generally comprise a receptacle portion 101 having sidewalls 102 and a bottom surface 103, and a cover portion 110. (FIG. 2.) The cable junction box 100 defines an interior volume for mounting such hardware therein as is necessary or desired in connection with a given application, such as, by way of non-limiting example, routing CATV cables from an overhead service line into a residence. In this and other respects, as will be understood from this disclosure, the cable junction box 100 of this invention is similar to the conventional cable junction box such as described in association with FIG. 1 above. Unlike the prior art cable junction box of FIG. 1, however, the present inventive cable junction box 100 is further characterized in that the interior volume of the receptacle portion 101 includes a plurality of hardware mounting channels 104 arranged to define a pattern or network of repeating geometric shapes, as discussed more fully below.

As used herein, the term "cable" is meant to refer generically to signal communication lines of all varieties, including, without limitation, CATV cables, telephone lines, Direct-to-Home ("DTH") lines, etc., as well as electrical cables.

Referring particularly to FIG. 2, the cover portion 110 most preferably is hingedly connected to the receptacle portion 101. The cover portion 110 may take any form as desired, and may be either of one-piece or of multiple-piece construction. In the illustrated embodiment, the cover portion 110 is of one-piece construction. By way of non-limiting example, however, it is also contemplated that the cover could include two parts, each hingedly connected to the receptacle.

Still referring to FIG. 2, the cover portion 110 may be formed of any material suitable to a desired application for the junction box. In the embodiment of this disclosure, a polymer material is preferred. Structural ribs 111, which may take any desired form as known to those of skill in the art, may be provided to strengthen the cover portion 110. The cover portion 110 may have more or less interior volume, as desired, and it is certainly contemplated that the cover portion 110 may be of sufficient interior dimensions to also accommodate hardware mounting channels 104 of the type shown and described in conjunction with the receptacle portion 101.

Cooperating latch means 112 provided on each of the cover portion 110 and receptacle portion 101 permit the cable junction box 100 to be securely closed. (FIG. 2.) Respectively, each of the cover portion 110 and receptacle portion 101 are further provided with a projection 113 and 105, including, respectively, bores 114 and 106 dimensioned to receive therethrough the shackle of a padlock (not shown) or other locking device, thereby protecting the junction box 100 against undesired tampering with the contents thereof.

With continuing reference to FIG. 2, one or more cables (not shown) are communicated to the interior of the junction box 100 via entry ports 107 provided in one or more of the sidewalls 102. Interiorly, a foam strip (not shown) or other sealing means may be provided adjacent the entry ports 107 to sealingly engage the incoming cable or cables, as described above in connection with the prior art junction box of FIG. 1, thereby sealing the interior against moisture and the like. Alternatively, other sealing means may be provided, including, without limitation, grommets individually associated with each cable, etc.

Figure 2:
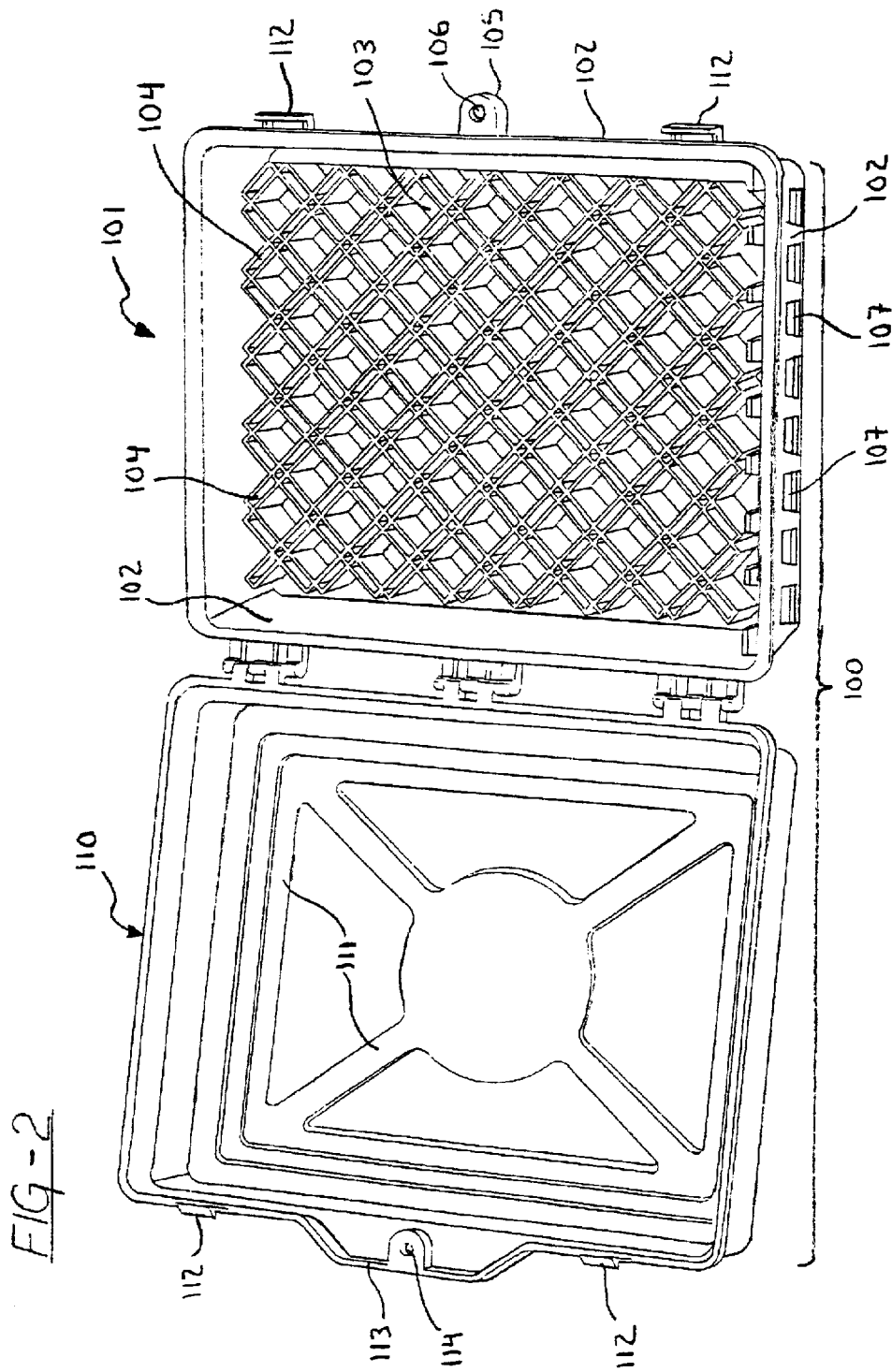
FIG. 2 is a perspective view of the universal cable junction box of the present invention.

The bottom surface 103 is further preferably provided with a plurality of recessed openings (not shown) therethrough, such as are known in the prior art junction box of FIG. 1, dimensioned to receive bolts, screws, or other fasteners 120 to thereby facilitate mounting the junction box 100 to a suitable support surface or structure, for instance the side of a residential or commercial building.

Most preferably, the cable junction box 100, including the cover 110 and receptacle 101 portions, is formed of a suitably durable material, such as metal, alloy, polymer, etc. As indicated above, the preferred material for the junction box of the illustrated example is a polymer, the junction box being manufactured from such material by any conventional means, including injection molding, etc. The junction box 100 is also preferably treated so as to be, or otherwise made of a material that is, suited to use in an outdoor environment, including, without limitation, resistance to the effects of insects, fungi, chemicals, excessive heat, ultraviolet radiation, etc., all as known to those of skill in the art. Of course, the preferred material of the illustrated embodiment may be varied according to user desire or need, and is not intended to be limiting of the junction box of this invention.

Figure 3:
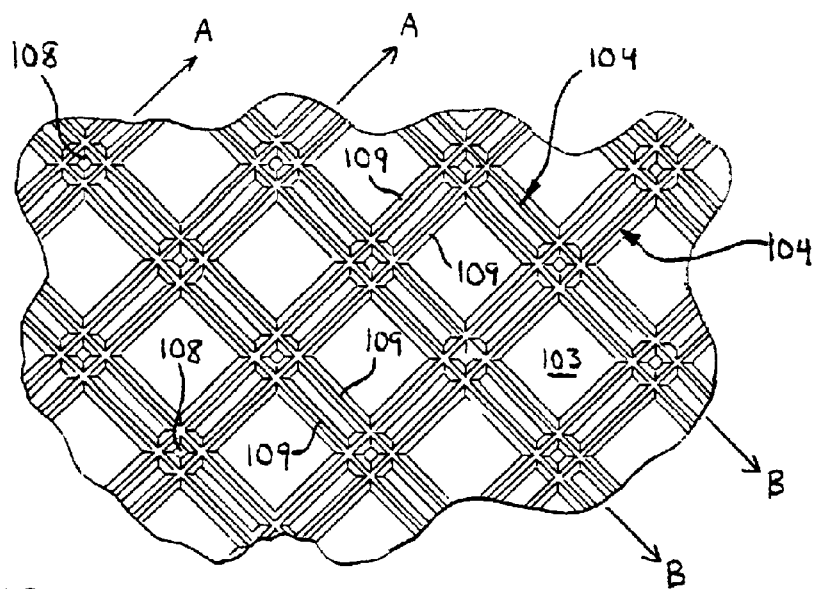
FIG. 3 is a detailed elevational view of the hardware mounting channels of the present invention, according to one embodiment thereof.
Figure 4:
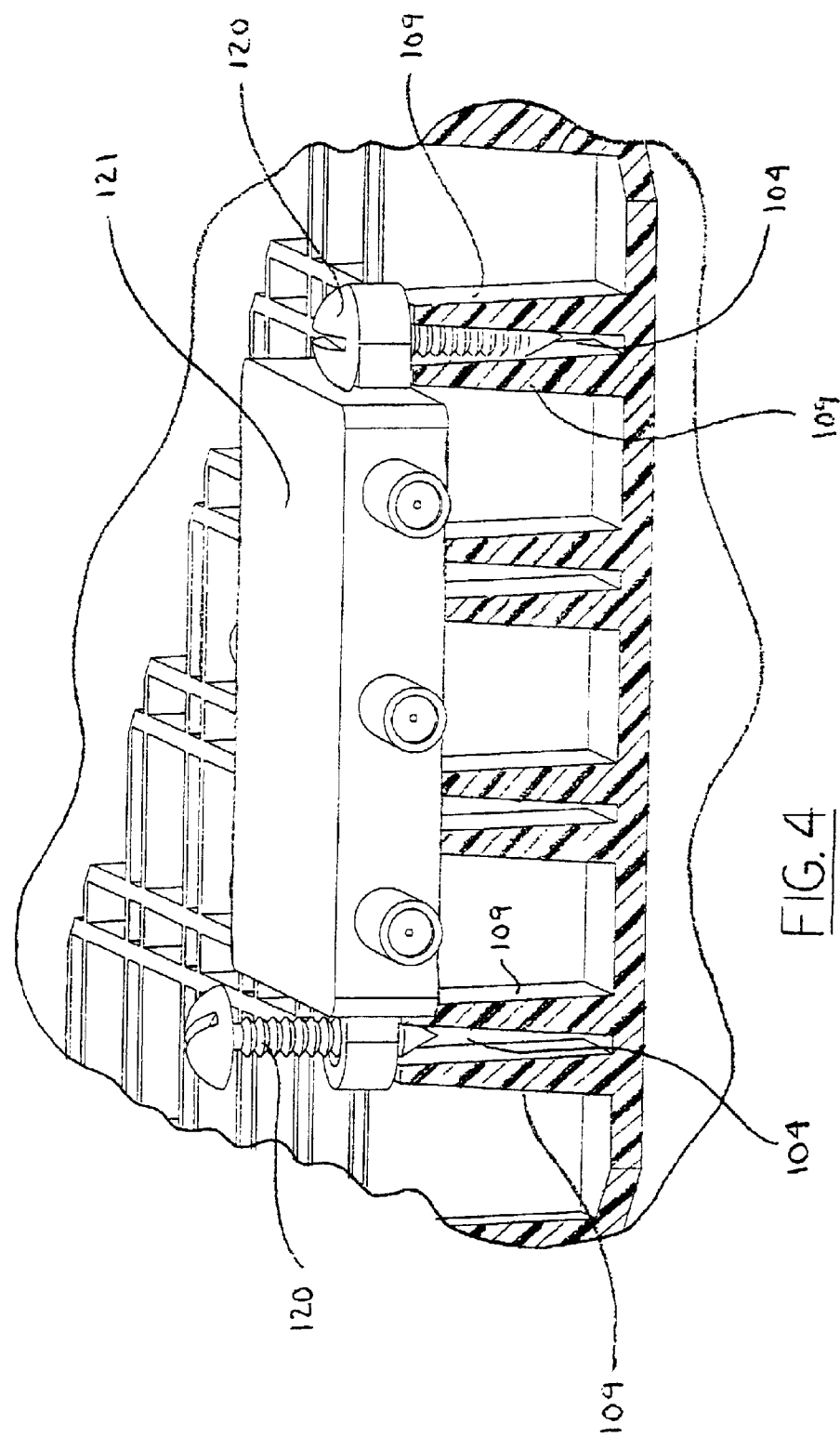
FIG. 4 is a detailed view depicting the hardware mounting channels in cross-section in combination with a hardware component.

Referring also to FIGS. 3 and 4, the present inventive cable junction box 100 will be seen to be particularly distinguishable from prior art junction boxes by reason of a plurality of hardware mounting channels 104 arranged to define a pattern or network of repeating geometric shapes. Most preferably, these hardware mounting channels 104 are arranged in the preferred geometric pattern in the interior of at least the receptacle portion 101. As shown, these hardware mounting channels 104 are arranged in a plurality of generally parallel rows extending in a first direction, and a plurality of generally parallel rows of hardware mounting channels extending in a second direction generally perpendicular to said first direction, the oppositely extending rows thereby defining a pattern characterized by repeating squares, all as shown. Each row of hardware mounting channels 104 is, in the illustrated embodiment of FIGS. 2–4, oriented at an angle relative to the plane of the sidewalls 102. However, the hardware mounting channels 104 of this embodiment may also be arranged so as to extend in directions generally perpendicular to the sidewalls 102.

Referring particularly to FIGS. 3 and 4, each hardware mounting channel 104 comprises a pair of spaced-apart, generally parallel interior walls 109 extending upwardly from the bottom surface 103 of the receptacle 101. The most preferred distance between these walls 109 is that which will securely accept such fastening devices, for instance the illustrated screws 120, etc., provided with any desired hardware (such as illustrated at 121) that is to be mounted in the junction box 100. As shown, the screws 120 or other fastening devices preferably engage each of the opposing interior walls 109 to securely retain the desired hardware 121 in place on the mounting channel 104. In the junction box 100 of the illustrated embodiment, the distance between parallel interior walls 109 at their top-most surfaces is approximately 0.13 inches, this distance tapering to approximately 0.06 inches as the walls 109 slope inwardly towards the bottom surface 103 of the receptacle 101 in the embodiment shown. The tapering of walls 109 of the illustrated embodiment is preferred, though not necessary as this feature facilitates stripping the junction box from a mold. Also as shown, the distance between parallel rows of hardware mounting channels 104 is approximately 0.71 inches, center to center. This distance, which, like the other distances specified herein, can be varied, is adapted to permit mounting of the greatest variety of conventional hardware on adjacent hardware mounting channels 104, and to further permit the positioning of such hardware in numerous orientations.

As indicated, the hardware mounting channels 104 are preferably arranged in generally parallel, spaced-apart rows. According to the most preferred embodiment of FIGS. 2–4, the hardware mounting channels 104 are arranged in pluralities of such rows extending in both first and second directions, with parallel rows A of hardware mounting channels 104 extending in a first direction being oriented perpendicular to parallel rows B of hardware mounting channels 104 extending in a second direction, all as shown. In this preferred arrangement, the rows of channels 104 define a pattern or network of generally square shapes, it having been found by the inventor hereof that this geometric arrangement is particularly well suited to permitting myriad arrangements and orientations of hardware components in the junction box 100 of this invention.

It is most preferred that the hardware mounting channels 104 are arranged in oppositely extending, intersecting rows as shown, and that the walls 109 of each such hardware mounting channel 104 extend continuously through its intersection with the walls 109 of the oppositely extending channels 104, thereby defining a generally square-shaped opening 108 at each such intersection. This opening 108 provides a further location for mounting such hardware as desired, all in the particular manner described elsewhere herein. By the arrangement of intersecting walls 109 and channels 104 as so described, the walls 109 of channels 104 extending in a first direction provide rigidity to the walls 109 of channels 104 extending in the second direction, thereby aiding in maintaining these walls 109 against yielding when hardware is mounted in the channels 104.

While the arrangement of the above-described network of geometric shapes is most preferred as providing the greatest flexibility in terms of mounting arrangements and orientations for hardware components, other arrangements are of course contemplated, and are certainly within the skill of those of ordinary skill in the art in view of this disclosure. By way of example, and without limitation, several such alternative arrangements of the hardware mounting channels 104 are shown in FIGS. 4–7. As will be seen from these figures generally, it is contemplated by this invention that the interior walls 109 may be substantially arranged such that the hardware mounting channels 104 define a pattern of concentric geometric shapes.

Figure 5:
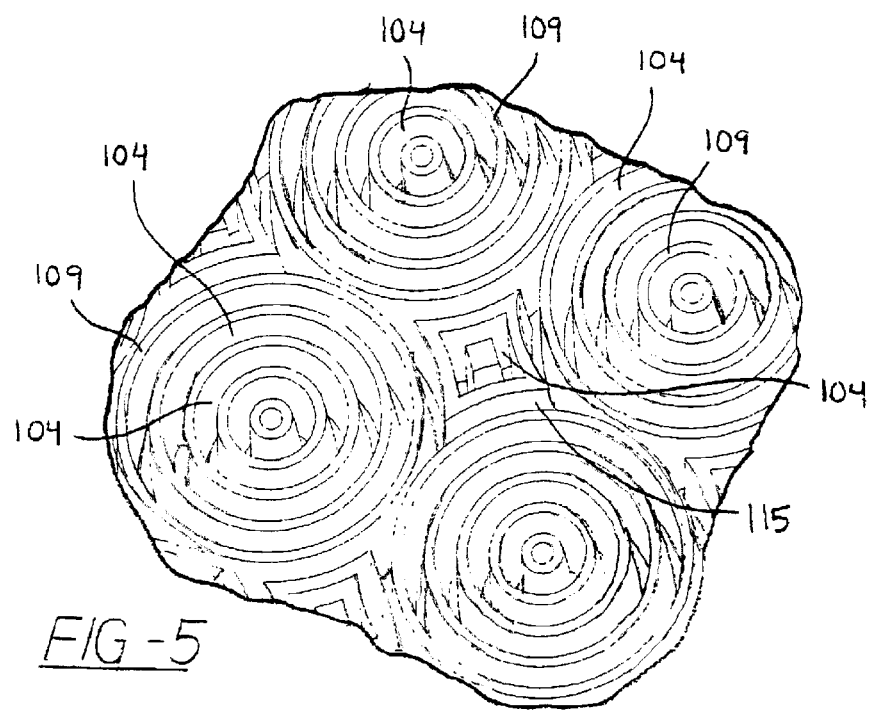
FIGS. 5–8 depict alternate embodiments of the hardware mounting channels of the present invention.

Referring specifically to FIG. 5, for example, there is provided an alternative embodiment having a plurality of groups of generally circular-shaped hardware mounting channels 104 arranged concentrically as defined by the interior walls 109. In between every four adjacent groups of such circular walls 109 is provided a generally diamond-shaped interior wall 115 partially defining a similarly shaped hardware mounting channel 104 therein.

Figure 6:
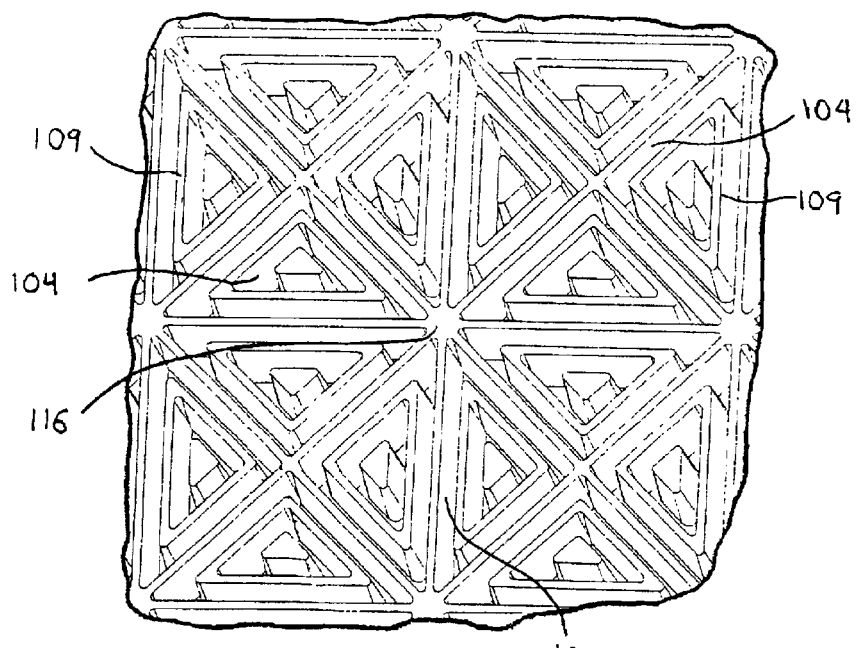

Alternatively, FIG. 6 depicts a plurality of groups of generally triangularly-shaped hardware mounting channels 104 arranged concentrically as defined by the interior walls 109. More particularly, it will be seen that this arrangement provides interior walls 109 extending continuously in four planes arranged at angles of approximately 45° relative to each other, these interior walls 109 intersecting at hubs 116 to define a network of larger triangle shapes. In each of these larger triangle shapes are provided further walls 109 arranged to define a smaller, concentrically disposed triangles, so that each such grouping of concentric triangles defines as shown, two hardware mounting channels 104.

Figure 7:
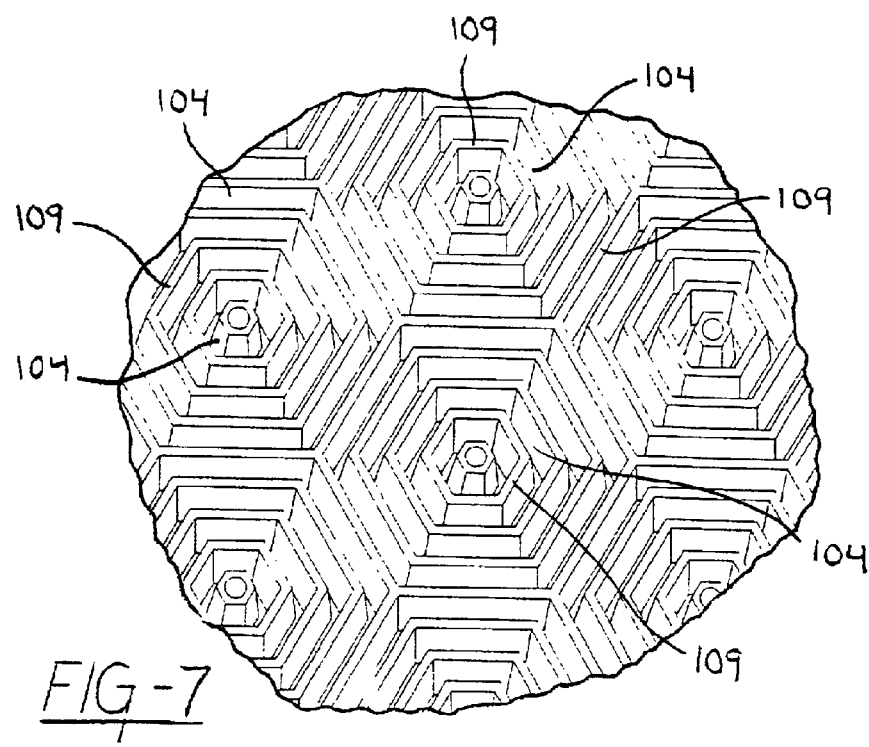

In a further alternative embodiment, shown in FIG. 7, a plurality of groups of generally hexagonally-shaped hardware mounting channels 104 are arranged concentrically as defined by the interior walls 109. As with the previous embodiment, it will be seen that this arrangement provides a continuously interconnected network of interior walls 109 defining a plurality of interconnected, larger hexagons in which are provided further interior walls 109 arranged to define successively smaller, concentrically disposed hexagons, so that each such grouping of concentric hexagons defines, as shown, four hexagonally-shaped hardware mounting channels 104.

Figure 8:
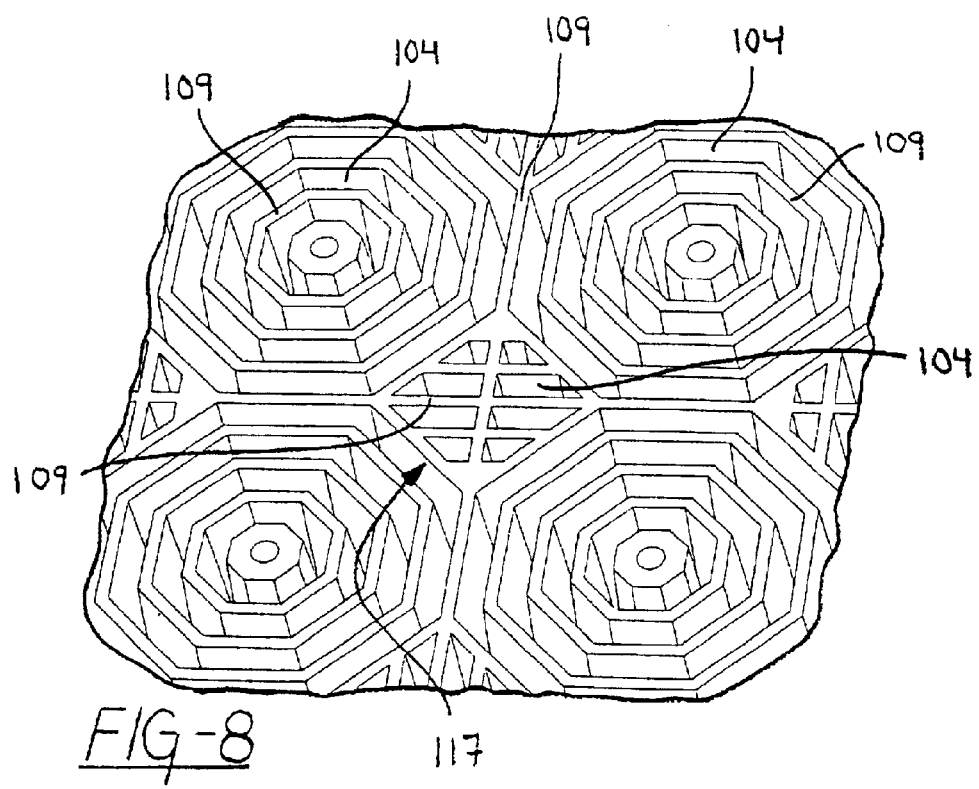

Another alternative embodiment is shown in FIG. 8 to comprise a plurality of groups of generally octagonally-shaped hardware mounting channels 104 arranged concentrically as defined by interior walls 109. This arrangement provides a continuously interconnected network of interior walls 109 defining a plurality of interconnected, larger octagons in each of which are provided further interior walls 109 arranged to define successively smaller, concentrically disposed octagons, so that each such grouping of concentric octagons defines, as shown, four octagonally-shaped hardware mounting channels 104. In between every four adjacent groups of octagons is provided a generally square-shaped structure 115 defined by interior walls 109, as shown, this structure further defining a number of parallelogram-shaped hardware mounting channels provided to further maximize the number and positions of hardware that can be mounted in the cable junction box of this invention.

It will be appreciated from the above disclosure that the present invention improves upon the prior art by providing a cable junction box that is at once a robust, universally applicable design, while still being simple and economical to manufacture.

Of course, the foregoing is merely illustrative of the present invention, and those of ordinary skill in the art will appreciate that many additions and modifications to the present invention, as set out in this disclosure, are possible without departing from the spirit and broader aspects of this invention as defined in the appended claims.

The invention in which an exclusive property or privilege is claimed is defined as follows:

1. A cable junction box having an interior volume defined by sidewalls, a bottom, and a cover, and at least one passageway through at least one of said sidewalls, bottom, and cover for communicating one or more cables to said interior volume, said interior volume having provided therein a plurality of hardware mounting channels oriented in at least first and second non-parallel directions in the same plane to collectively define a pattern of repeating geometric shapes, each said hardware mounting channel comprising a pair of interior walls, said interior walls each having an upper surface for supporting thereon one or more hardware components, and each said pair of interior walls defining a space therebetween for receiving one or more fasteners between said pair of interior walls for securing the one or more hardware components in place.

2. The cable junction box of claim 1, wherein said hardware mounting channels are arranged to define a pattern of repeating hexagons.

3. The cable junction box of claim 1, wherein said hardware mounting channels are arranged to define a pattern of repeating circles.

4. The cable junction box of claim 1, wherein said hardware mounting channels are arranged to define a pattern of repeating octagons.

5. The cable junction box of claim 1, wherein said hardware mounting channels are arranged to define a pattern of repeating triangles.

6. The cable junction box of claim 1, wherein said hardware mounting channels are arranged to define a pattern of repeating squares.

7. A cable junction box having an interior volume defined by sidewalls, a bottom, and a cover, said interior volume having provided therein a plurality of hardware mounting channels, each said hardware mounting channel comprising a pair of spaced-apart, generally parallel interior walls, said hardware mounting channels being arranged in a plurality of generally parallel rows extending in a first direction, and a plurality of generally parallel rows of said hardware mounting channels extending in a second direction generally perpendicular to said first direction, to thereby defined a pattern characterized by repeating squares.

8. The cable junction box of claim 7, wherein adjacent parallel rows of hardware mounting channels are spaced approximately 0.71 inches apart.

9. The cable junction box of claim 7, wherein the plurality of rows of hardware mounting channels are oriented at an angle relative to the side walls of the cable junction box.

10. The cable junction box of claim 9, wherein adjacent parallel rows of hardware mounting channels are spaced approximately 0.71 inches apart.

11. The cable junction box of claim 7, wherein said interior walls extend generally upwardly from said bottom, and wherein further said interior walls extend continuously through the intersection of each of said rows of hardware mounting channels.

12. The cable junction box of claim 11, wherein adjacent parallel rows of hardware mounting channels are spaced approximately 0.71 inches apart.

13. A cable junction box having an interior volume defined by sidewalls, a bottom, and a cover, said interior volume having provided therein a plurality of hardware mounting channels each comprising by a pair of spaced-apart, generally parallel interior walls extending generally upwardly from said bottom, and wherein further said hardware mounting channels extend substantially continuously between said sidewalls in a plurality of generally parallel, spaced-apart rows extending in a first direction oriented at an angle relative to said sidewalls, and a plurality of generally parallel, spaced-apart rows extending in a second direction generally perpendicular to said first direction, such that the intersecting rows of hardware mounting channels define a pattern of generally square shapes.

14. The cable junction box of claim 13, wherein adjacent parallel rows of hardware mounting channels are spaced approximately 0.71 inches apart.

15. A cable junction box comprising an interior volume and at least one passageway through said junction box for communicating one or more cables to said interior volume, said interior volume having provided therein a plurality of spaced-apart interior walls arranged to collectively define a pattern of repeating geometric shapes, said interior walls each having an upper surface for supporting thereon one or more hardware components, wherein adjacent pairs of said interior walls define channels therebetween adapted to receive fasteners for securing the one or more hardware components in place on the interior walls' said upper surfaces, and wherein further said channels defined by said adjacent pairs of interior walls are oriented in at least first and second non-parallel directions in the same plane.

* * * * *

UNITED STATES PATENT AND TRADEMARK OFFICE
CERTIFICATE OF CORRECTION

PATENT NO. : 6,743,977 B1
DATED : June 1, 2004
INVENTOR(S) : Sterett

It is certified that error appears in the above-identified patent and that said Letters Patent is hereby corrected as shown below:

Column 1,
Line 23, delete "modem" and insert -- modern --;

Column 7,
Line 22, delete "defined" and insert -- define --.

Signed and Sealed this

Eighth Day of March, 2005

JON W. DUDAS
*Director of the United States Patent and Trademark Office*

UNITED STATES PATENT AND TRADEMARK OFFICE
CERTIFICATE OF CORRECTION

PATENT NO. : 6,743,977 B1  Page 1 of 1
DATED : June 1, 2004
INVENTOR(S) : Sterett It is certified that error appears in the above-identified patent and that said Letters Patent is hereby corrected as shown below:

Column 4,
Line 13, delete "120".

Signed and Sealed this

Twenty-sixth Day of April, 2005

JON W. DUDAS
*Director of the United States Patent and Trademark Office*